United States Patent
Griera

(10) Patent No.: US 12,388,637 B2
(45) Date of Patent: Aug. 12, 2025

(54) HARDWARE SECURITY MODULE PROXY DEVICE FOR STORAGE EXPANSION

(71) Applicant: Entrust Corporation, Shakopee, MN (US)

(72) Inventor: Jordi Íñigo Griera, Barcelona (ES)

(73) Assignee: Entrust Corporation, Shakopee, MN (US)

( * ) Notice: Subject to any disclaimer, the term of this patent is extended or adjusted under 35 U.S.C. 154(b) by 0 days.

(21) Appl. No.: 17/218,880

(22) Filed: Mar. 31, 2021

(65) Prior Publication Data

US 2021/0306149 A1 Sep. 30, 2021

Related U.S. Application Data

(60) Provisional application No. 63/003,025, filed on Mar. 31, 2020.

(51) Int. Cl.
*H04L 9/08* (2006.01)
*H04L 9/32* (2006.01)

(52) U.S. Cl.
CPC .......... *H04L 9/0877* (2013.01); *H04L 9/0825* (2013.01); *H04L 9/0894* (2013.01); *H04L 9/3247* (2013.01)

(58) Field of Classification Search
CPC ... H04L 9/0877; H04L 9/0825; H04L 9/0894; H04L 9/3247
USPC ........................................................ 713/168
See application file for complete search history.

(56) References Cited

U.S. PATENT DOCUMENTS

| | | | |
|---|---|---|---|
| 6,694,436 B1* | 2/2004 | Audebert | G06Q 20/4014 707/999.203 |
| 10,425,225 B1* | 9/2019 | Grubin | H04L 9/0643 |
| 10,693,638 B1* | 6/2020 | Cignetti | G06F 21/602 |
| 10,958,437 B2* | 3/2021 | Sabin | H04L 9/3247 |
| 11,316,683 B2* | 4/2022 | Park | H04L 9/3247 |
| 2004/0039925 A1* | 2/2004 | McMillan | H04L 63/06 713/150 |
| 2014/0281483 A1* | 9/2014 | Vigliaturo | H04L 63/0471 713/153 |
| 2016/0105429 A1* | 4/2016 | Boenisch | H04L 63/0853 713/171 |
| 2018/0219678 A1 | 8/2018 | Medvinsky et al. | |

(Continued)

OTHER PUBLICATIONS

International Search Report and Written Opinion for Application No. PCT/US2021/025141 mailed Jul. 21, 2021.

(Continued)

*Primary Examiner* — Moeen Khan

(74) *Attorney, Agent, or Firm* — Merchant & Gould, P.C.

(57) ABSTRACT

A proxy hardware security module (HSM) is disclosed, useable with an existing HSM for expansion of key storage for the HSM. The proxy HSM receives a signing request that is targeted to the HSM, and retrieves a wrapped version of a signing key from a storage location separate from the HSM. The proxy HSM provides the wrapped signing key to the HSM, and provides the signing request to the HSM. Upon receipt of a response to the signing request indicating successful execution of a signing operation by the HSM, the proxy HSM transmits a key destroying request to the HSM, and a confirmation message to the device from which the signing request was received. Upon completion of the signing request, the HSM does not retain the signing key.

19 Claims, 5 Drawing Sheets

(56) References Cited

U.S. PATENT DOCUMENTS

| | | |
|---|---|---|
| 2019/0007220 A1 | 1/2019 | Falk |
| 2019/0052612 A1 | 2/2019 | Norton |
| 2019/0132127 A1 | 5/2019 | Birke et al. |
| 2019/0280864 A1 | 9/2019 | Cheng et al. |
| 2019/0342079 A1 | 11/2019 | Rudzitis et al. |
| 2021/0056547 A1* | 2/2021 | Monica .............. G06Q 20/3674 |

OTHER PUBLICATIONS

European Search report for Application No. 21779658.0 mailed Mar. 27, 2024.

\* cited by examiner

HARDWARE SECURITY MODULE PROXY DEVICE FOR STORAGE EXPANSION

CROSS-REFERENCE TO RELATED APPLICATIONS

The present application claims priority from U.S. Provisional Patent Application No. 63/003,025, filed in Mar. 31, 2020, the disclosure of which is hereby incorporated by reference in its entirety.

BACKGROUND

A hardware security module (HSM) is a physical computing device that safeguards and manages digital keys for authentication and cryptographic process. Typically, hardware security modules are in the form of a card or external device that attaches to a computer or server. A hardware security module typically will include one or more cryptographic processor circuits.

Such hardware security modules have limitations. For example, because hardware security modules manage digital keys, those digital keys typically must be stored at the hardware security module to ensure security of the keys. Often, keys stored outside of a hardware security module would not be trusted, because they may be stored on other systems having a database or memory that could be externally accessed and compromised. However, because of this, hardware security modules are subject to a limitation in terms of the number of keys and other data that can be stored due to physical memory storage constraints. Therefore, use of multiple hardware security modules to accommodate key storage may be required, and responsibility for different sets of cryptographic key must be assigned to specific HSMs. Subsequent signing requests must then be routed to the appropriate HSM for handling, leading to additional complexity.

SUMMARY

The present disclosure relates generally to use of a proxy hardware security module that is capable of securely managing signing keys externally from the hardware security module.

In a first aspect, a method of managing a signing request includes receiving, at a proxy hardware security module, a signing request that is targeted to a hardware security module associated with the proxy hardware security module. The method further includes, at the proxy hardware security module, retrieving a wrapped version of a signing key that is required to fulfill the signing request, and providing, from the proxy hardware security module to the hardware security module, the signing request and the wrapped version of the signing key. The method further includes, at the hardware security module, unwrapping the wrapped version of the signing key using a wrapping key securely stored at the hardware security module to generate an unwrapped version of the signing key. The method includes performing a signing operation at the hardware security module using the unwrapped version of the signing key, and, upon completion of the signing operation, destroying the unwrapped version of the signing key.

In a second aspect, a system includes a proxy hardware security module (HSM). The proxy HSM includes a processor and a memory storing instructions executable by the processor to cause the proxy hardware security module to: receive a signing request that is targeted to a hardware security module associated with the proxy hardware security module; retrieve a wrapped version of a signing key that is required to fulfill the signing request from a storage location separate from the hardware security module; and provide, to the hardware security module, the signing request and the wrapped version of the signing key. Prior to providing the wrapped version of the signing key, the hardware security module generates but does not retain the signing key. Upon receiving a response to the signing request from the hardware security module, the signing key is not retained at the hardware security module.

In a third aspect, a proxy hardware security module is disclosed. The proxy hardware security module includes a processor and a memory storing instructions executable by the processor. The instructions cause the proxy hardware security module to transmit a request to the hardware security module for generation of the signing key, receive a wrapped version of the signing key from the hardware security module, and, in response to receiving the wrapped version of the signing key, transmit a key destroying message to the hardware security module. The instructions further cause the proxy hardware security module to store the wrapped version of the signing key in storage remote from the hardware security module, and receive a signing request that is targeted to a hardware security module associated with the proxy hardware security module. The instructions also cause the proxy hardware security module to retrieve a wrapped version of a signing key that is required to fulfill the signing request from a storage location separate from the hardware security module, and provide, to the hardware security module, the signing request and the wrapped version of the signing key. The instructions also cause the proxy hardware security module to, upon receipt of a response to the signing request indicating successful execution of a signing operation by the hardware security module, transmitting a key destroying request to the proxy hardware security module, such that upon completion of the signing request, the hardware security module does not retain the signing key.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
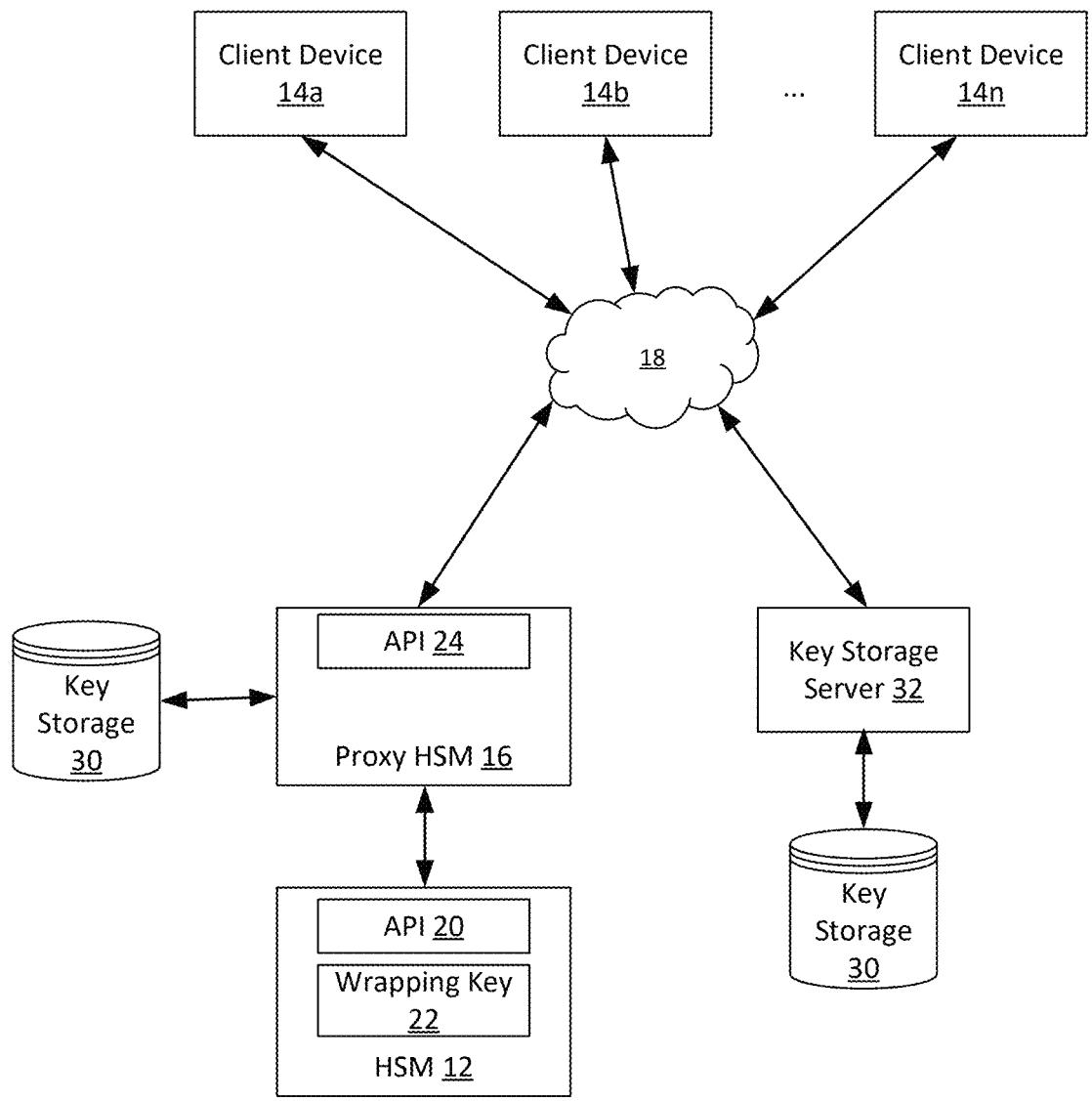
FIG. 1 illustrates an environment within which aspects of the present disclosure can be implemented, including a proxy hardware security module useable according to an example embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present disclosure are directed to methods and devices for expanding storage capabilities of a hardware security module (HSM). In example implementations described herein, methods may include use of HSM functions to wrap and unwrap keys at appropriate time to ensure that keys stored externally from the HSM are maintained securely. Additionally, a proxy HSM may be used to receive a signing requests targeting the HSM, and the proxy HSM can obtain and provide to the HSM a wrapped key that may in turn be unwrapped and used in a signing process at the HSM. Once the signing operation is complete at the HSM, the key may be destroyed. Accordingly, at any given time, the HSM may only be required to store those keys which are used in conjunction with current signing operations, thereby greatly reducing storage requirements at the HSM. In some aspects, such external key management allows for apparent increased key storage capacity of the hardware security module in a way that is obscured to the end user. This may reduce the need for additional HSM hardware devices, and therefore reduce overall cost of a security system.

An example environment 10 in which aspects of the present disclosure may be implemented is shown in FIG. 1. In the environment 10 as shown, a hardware security module (HSM) 12 is generally operable to receive requests from one or more client devices 14a-n (referred to individually as client devices 14 or clients 14). The requests from the client devices 14a-n can include, for example, requests to create a signing key, signing requests to be performed with such a signing key, and other various security operations.

In typical operation of an HSM 12, requests for keys, as well as signature requests, are received at the HSM, which can generate a signing key and retain that signing key securely within memory internal to the HSM. However, as noted above, such memory capacity can be limited, particularly in environments having a large number of client devices and/or large numbers of keys. Accordingly, in some example existing systems, large numbers of HSMs are required to be used in parallel, and signing requests must be routed to the appropriate HSM.

In general operation, a HSM 12 can expose an API 20, allowing remote clients 14 to transmit requests to generate signing keys, or perform a signing operation, on behalf of the client to verify security of particular transactions. In the example shown, the API can implement the PKCS #11 Cryptographic Token Interface Specification, available from the Organization for the Advancement of Structured Information Standards (OASIS). However, other cryptographic key management protocols could be used as well.

In some examples, the HSM 12 may maintain a wrapping key 22 within memory of the HSM, in addition to a collection of signing keys that are specific to (or requested by) clients 14. The wrapping key 22 can be used, in some cases, to encrypt signing keys that are maintained within the HSM 12, to ensure that even if the signing keys are extracted from the HSM 12, the signing keys cannot be used by other devices to perform signing operations.

In the current example as shown, a proxy hardware security module 16 (also referred to as a proxy HSM) is communicatively connected to the HSM 12, and to receive requests from clients 14a-n via a communication network 18 (e.g., the Internet). The proxy HSM 16 is positioned and configured to receive requests that are targeted to the HSM 12. In the example shown, the proxy HSM 16 can expose a second API 24 that is capable of receiving at least the set of comments that are able to be received at the API 20 of the HSM 12.

In example embodiments, the proxy HSM 16 is configured to receive requests at the second API 24, and may add to or translate those commands before forwarding the commands to the HSM 12. In example embodiments, the proxy HSM 16 performs additional commands in association with commands to create a signing key or translate a signing key, for example to extract and store an encrypted version of the signing key at remote storage, and/or to provide the wrapped signing key (which was previously stored remotely) to the HSM 12 for use in conjunction with a signing request.

In example embodiments, a key storage 30 is positioned remotely from the HSM 12 (i.e., at a location outside the HSM, whether at the same premise or different premises). In general, the key storage 30 stores signing keys that are generated at the HSM 12. The key storage 30 may store the signing keys in association with identifying information indicative of the particular entity (e.g., client 14), which can be used to retrieve the stored wrapped signing keys from the key storage 30 upon the proxy HSM 16 receiving a request from a client 14. The key storage 30 may simply be a file/folder system, or may be a database configured for secure access.

In example embodiments, the key storage 30 may be located at the proxy HSM 16 (either within memory of the proxy HSM 16 or adjacent thereto), However, and as further seen in the embodiment shown, a key storage server 32 may be positioned remotely from the proxy HSM 16 and HSM 12. The key storage server 32 may manage a key storage 30, e.g., within a database local to that key storage server. In still further embodiments, the key storage 30 may be maintained both locally and remotely from the proxy HSM 16: in any event, the key storage 30 is remote from the HSM 12.

Figure 2:
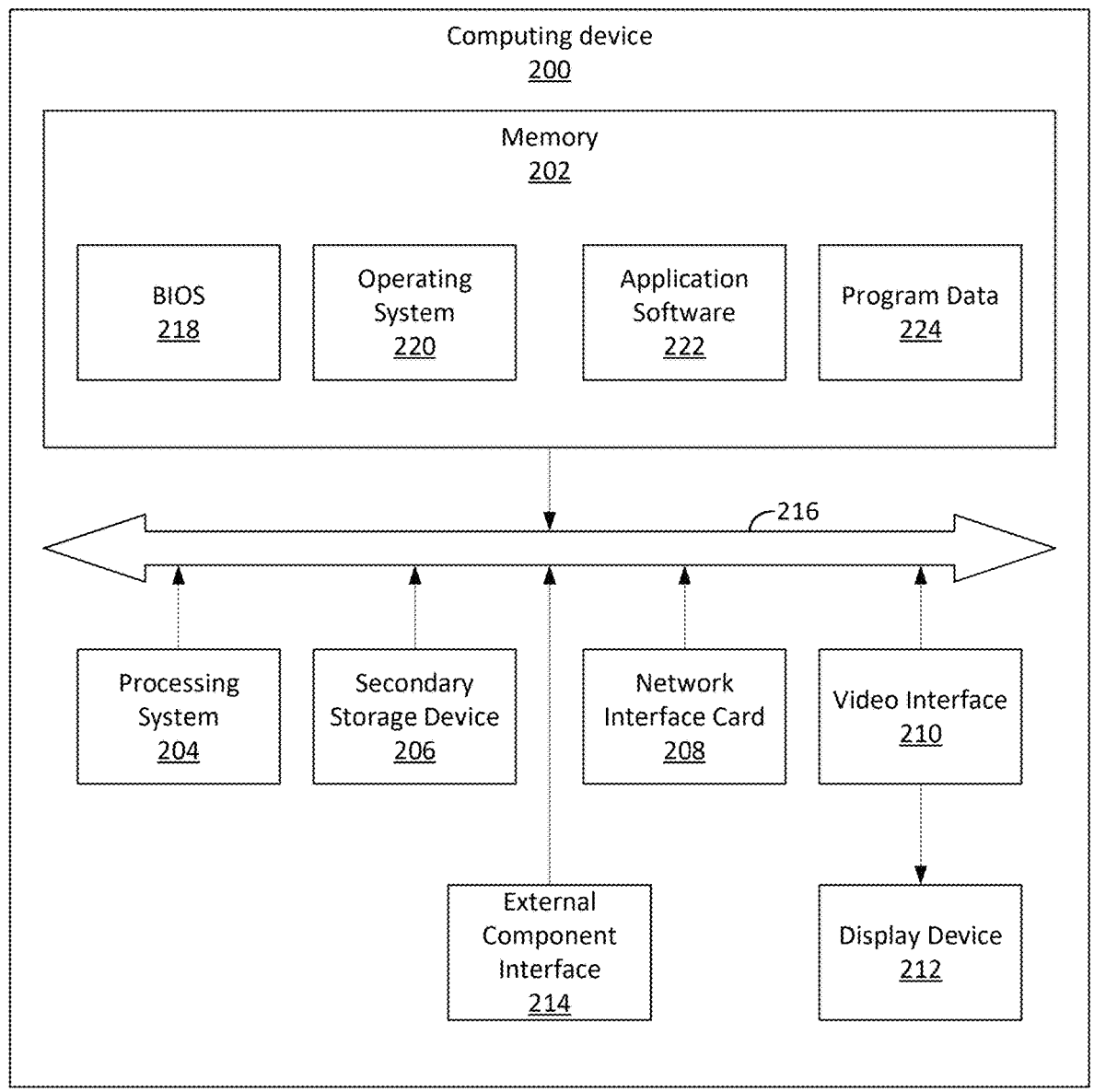
FIG. 2 illustrates an example computing device with which aspects of the present disclosure can be implemented.

FIG. 2 illustrates an example computing device with which aspects of the present disclosure can be implemented. The computing device 200 can be used, for example, to implement a proxy HSM 16, storage server 32, client 14 or any other computing device useable as described above in connection with FIG. 1.

In the example of FIG. 2, the computing device 200 includes a memory 202, a processing system 204, a secondary storage device 206, a network interface card 208, a video interface 210, a display unit 212, an external component interface 214, and a communication medium 216. The memory 202 includes one or more computer storage media capable of storing data and/or instructions. In different embodiments, the memory 202 is implemented in different ways. For example, the memory 202 can be implemented using various types of computer storage media, and generally includes at least some tangible media. In some embodiments, the memory 202 is implemented using entirely non-transitory media.

The processing system 204 includes one or more processing units, or programmable circuits. A processing unit is a physical device or article of manufacture comprising one or more integrated circuits that selectively execute software instructions. In various embodiments, the processing system 204 is implemented in various ways. For example, the processing system 204 can be implemented as one or more physical or logical processing cores. In another example, the processing system 204 can include one or more separate microprocessors. In yet another example embodiment, the processing system 204 can include an application-specific integrated circuit (ASIC) that provides specific functionality. In yet another example, the processing system 204 provides specific functionality by using an ASIC and by executing computer-executable instructions.

The secondary storage device 206 includes one or more computer storage media. The secondary storage device 206 stores data and software instructions not directly accessible by the processing system 204. In other words, the processing system 204 performs an I/O operation to retrieve data and/or software instructions from the secondary storage device 206. In various embodiments, the secondary storage device 206 includes various types of computer storage media. For example, the secondary storage device 206 can include one or more magnetic disks, magnetic tape drives, optical discs, solid-state memory devices, and/or other types of tangible computer storage media.

The network interface card 208 enables the computing device 200 to send data to and receive data from a communication network. In different embodiments, the network interface card 208 is implemented in different ways. For example, the network interface card 208 can be implemented as an Ethernet interface, a token-ring network interface, a fiber optic network interface, a wireless network interface (e.g., WiFi, WiMax, etc.), or another type of network interface.

In optional embodiments where included in the computing device 200, the video interface 210 enables the computing device 200 to output video information to the display unit 212. The display unit 212 can be various types of devices for displaying video information, such as an LCD display panel, a plasma screen display panel, a touch-sensitive display panel, an LED screen, a cathode-ray tube display, or a projector. The video interface 210 can communicate with the display unit 212 in various ways, such as via a Universal Serial Bus (USB) connector, a VGA connector, a digital visual interface (DVI) connector, an S-Video connector, a High-Definition Multimedia Interface (HDMI) interface, or a Display Port connector.

The external component interface 214 enables the computing device 200 to communicate with external devices. For example, the external component interface 214 can be a USB interface, a FireWire interface, a serial port interface, a parallel port interface, a PS/2 interface, and/or another type of interface that enables the computing device 200 to communicate with external devices. In various embodiments, the external component interface 214 enables the computing device 200 to communicate with various external components, such as external storage devices, input devices, speakers, modems, media player docks, other computing devices, scanners, digital cameras, and fingerprint readers.

The communication medium 216 facilitates communication among the hardware components of the computing device 200. The communications medium 216 facilitates communication among the memory 202, the processing system 204, the secondary storage device 206, the network interface card 208, the video interface 210, and the external component interface 214. The communications medium 216 can be implemented in various ways. For example, the communications medium 216 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 202 stores various types of data and/or software instructions. The memory 202 stores a Basic Input/Output System (BIOS) 218 and an operating system 220. The BIOS 218 includes a set of computer-executable instructions that, when executed by the processing system 204, cause the computing device 200 to boot up. The operating system 220 includes a set of computer-executable instructions that, when executed by the processing system 204, cause the computing device 200 to provide an operating system that coordinates the activities and sharing of resources of the computing device 200. Furthermore, the memory 202 stores application software 222. The application software 222 includes computer-executable instructions, that when executed by the processing system 204, cause the computing device 200 to provide one or more applications. The memory 202 also stores program data 224. The program data 224 is data used by programs that execute on the computing device 200.

Although particular features are discussed herein as included within an electronic computing device 200, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 200 of FIG. 2, the computer-readable instructions are stored on devices that include non-transitory media. In particular embodiments, the computer-readable instructions are stored on entirely non-transitory media.

Figure 3:
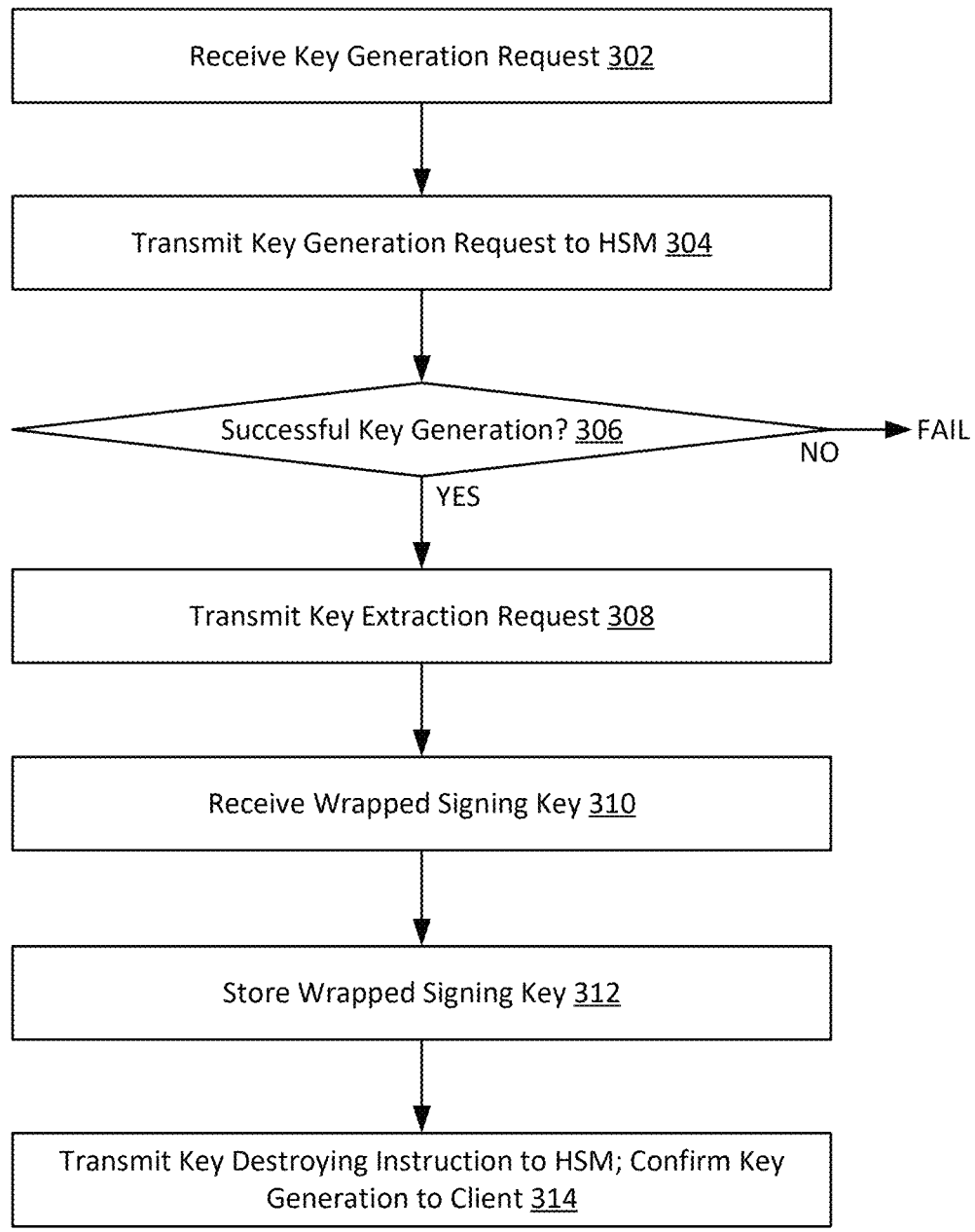
FIG. 3 illustrates a flowchart of a method of managing a key generation request from a proxy hardware security module, in an example embodiment of the present disclosure.
Figure 4:
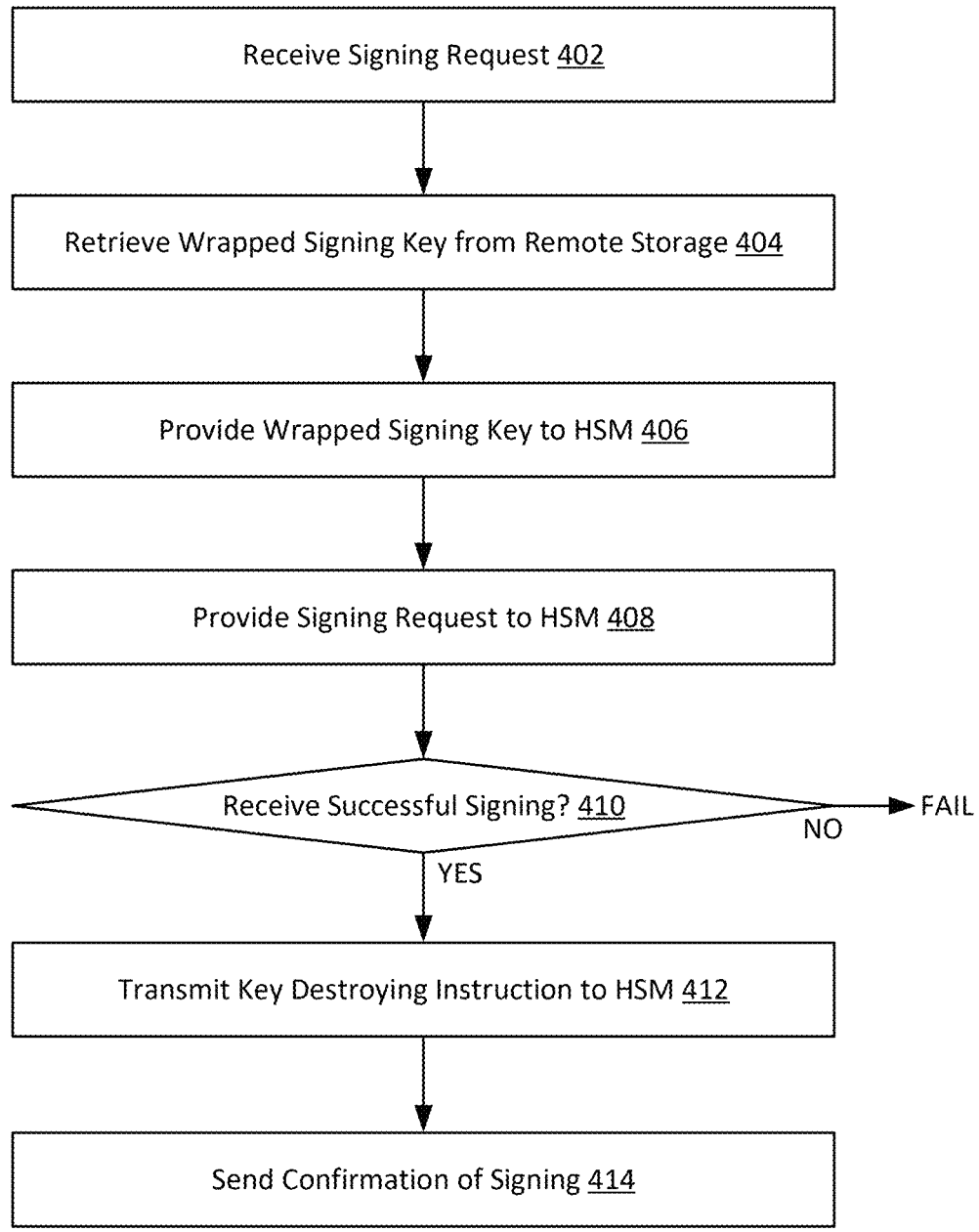
FIG. 4 illustrates a flowchart of a method of managing a signing request from a proxy hardware security module, in an example embodiment of the present disclosure.
Figure 5:
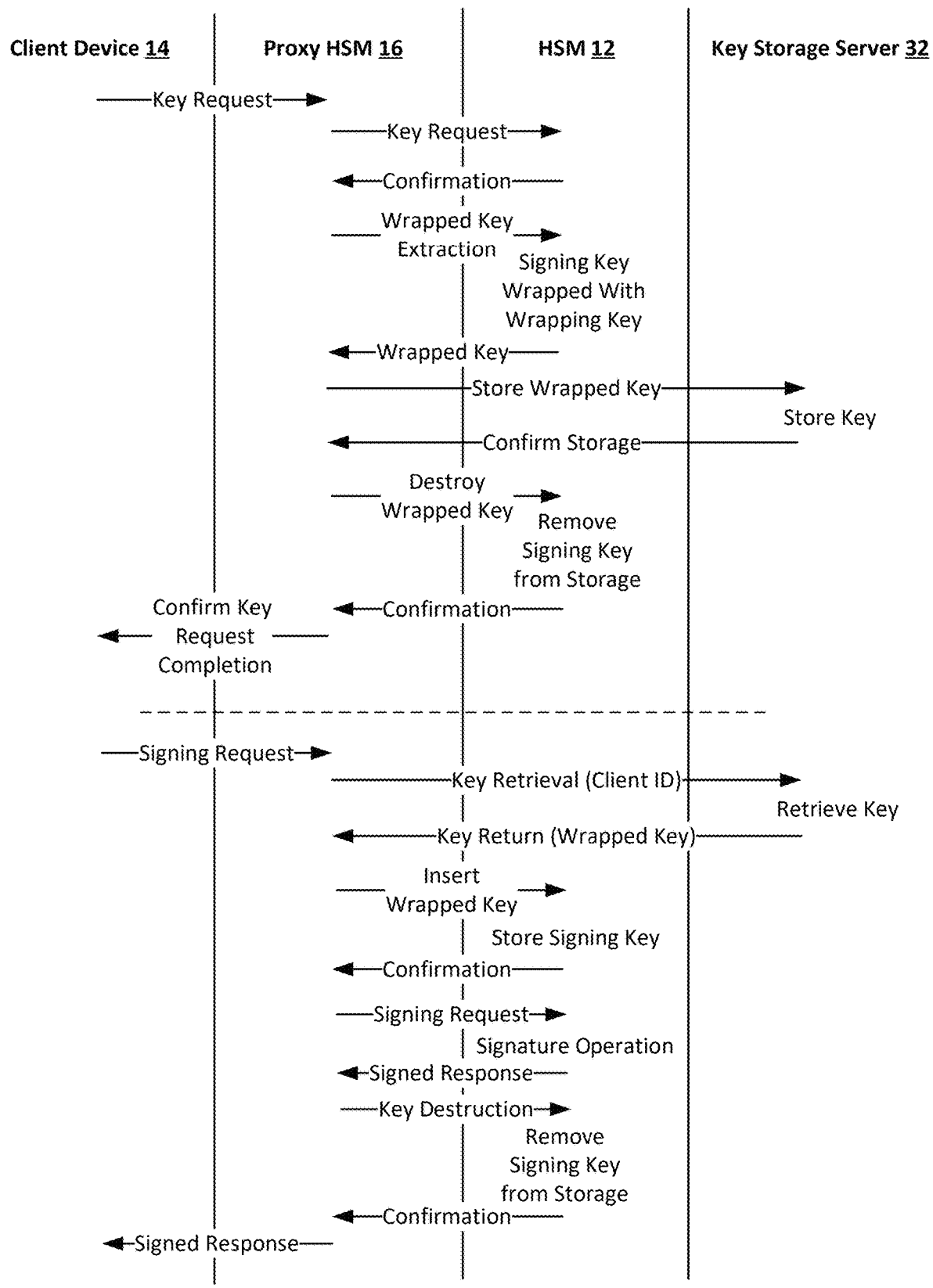
FIG. 5 illustrates an operational sequence for managing key generation and signing requests in the environment illustrated in FIG. 1.

Referring now to FIGS. 3-5, example embodiments are illustrated which describe techniques and devices for extending storage of a HSM using operations of a proxy HSM, such as the proxy HSM 16 as seen in FIG. 1, above. FIG. 3 illustrates a flowchart of a method 300 of managing a key generation request from a proxy HSM, in an example embodiment of the present disclosure, and FIG. 4 illustrates a flowchart of a method 400 managing a signing request from such a proxy HSM, e.g., after a signing key is generated in accordance with the method 300 of FIG. 3.

In the example shown, the method 300 includes receiving a key generation request (step 302), e.g., from a client device 14. The key generation request may include, for example, a request that a new signing key be generated at an HSM 12. Upon receipt of the key generation request, the proxy HSM 16 can transmit the key generation a request to the HSM 12 (step 304). A variety of types of keys can be generated using different commands in the example implementation using PKCS: for example, a PKCS "keygen" operation could be used. After transmitting the request, the HSM 12 may generate the signing key and return a response to the proxy HSM 16.

At operation 306, the proxy HSM 16 can determine whether the signing key is generated successfully. If the key generation is not successful, the method 300 fails. However, if the key generation is successful, the proxy HSM 16 can transmit a key extraction request to the HSM 12 (step 308). The key extraction request can be, for example, a request submitted to the API 20 to obtain a wrapped copy of the signing key that was created in response to the key generation request. The proxy HSM 16 will then receive a wrapped version of the signing key (step 310). The wrapped version of the signing key corresponds to the signing key created at the HSM 12 but encrypted with a wrapping key at the HSM 12 such that the signing key cannot be used externally from the HSM.

The proxy HSM 16 can then store the wrapped version of the signing key in a key storage (e.g., key storage 30) that is remote from the HSM 12 (step 312). As noted above, the key storage may be included within or adjacent to the proxy HSM 16, or may be managed at a key storage server (such as key storage server 32) remote from the proxy HSM 16 and the HSM 12.

In the embodiment shown, the method 300 further includes transmitting a key destroying instruction to the HSM 12, as well as confirming key generation to the requesting client 14 (step 314). In such embodiments, the key destroying instruction may correspond to an instruction submitted to the API 20 to remove the signing key from storage within the HSM 12. In the context of the PKCS protocol, the key destroying instruction can correspond to the "pkcs-destroy" operation, which allows a client to identify a particular object (e.g., key) to be destroyed). Accordingly, following the key destroying instruction, the HSM 12 does not store the signing key within an internal memory. Rather, such a signing key must be re-loaded into the HSM 12 prior to use (e.g., in a signing operation). An example of such a signing operation is discussed in further detail below in conjunction with FIG. 4.

Referring now to FIG. 4, an example method 400 of managing a signing request from a proxy hardware security module is shown. The example method 400 may be performed by a proxy HSM 16 after a signing key is generated, which can be accomplished according to the method described above in conjunction with FIG. 3. The method 400 can be performed in any of a variety of other contexts, e.g., whenever a wrapped signing key is stored external from the HSM that created that key, and where the signing key must be reintroduced to the HSM prior to performing a signing operation. In this way, signing keys may be maintained outside of the HSM storage, and therefore storage requirements for keys at the HSM are greatly reduced, or at the very least, selected keys do not need to be stored at the HSM (e.g., infrequently used keys). This increases the apparent storage capacity of a particular HSM while avoiding storage of signing keys (or at least infrequently used signing keys) at the HSM.

In the embodiment shown, the method 400 includes receiving a signing request at the proxy HSM (step 402). The signing request can be, for example, a signing request from a particular client 14. The signing request can include, for example, an identity of the client or key identifier, and is received at the API 24 of the proxy HSM 16.

The method 400 further includes retrieving a wrapped signing key from remote key storage 30 (step 404). The proxy HSM 16 may retrieve the wrapped signing key from its own local key storage, or retrieve the wrapped signing key from a key server 32 as noted above in conjunction with FIGS. 1 and 3. The wrapped signing key may be retrieved based on an identity of the client or key, or other identifying information in the signing request (e.g., information in the request received from the client). In some examples, the wrapped signing key is stored in a database indexed by a client identifier or other identifying information.

In the method 400 as shown, the wrapped signing key which was retrieved can then be provided from the proxy HSM 16 to the HSM 12 (step 406), e.g., at the API 20. Additionally, the proxy HSM 16 may transmit to the HSM 12 the signing request (step 408). In example embodiments, the wrapped signing key may be provided to the HSM 12 prior to transmitting the signing request. This may be, for example, where the wrapped signing key must be reintroduced to the HSM 12 so the signing request may be successfully performed. However, in some other embodiments, the wrapped signing key may be provided alongside the signing request.

At operation 410, it is determined whether the signing request occurred successfully. This may be accomplished, for example, based on receipt of a signing confirmation from the HSM 12. If the signing request was not completed, the process 400 fails. However, if the signing request completed successfully, the proxy HSM 16 will transmit a key destroying instruction from the proxy HSM 16 to the HSM 12 (step 412). Accordingly, upon completion of the signing request, the HSM 12 can be instructed to remove the signing key from its storage, thereby reducing storage requirements during a period of time the HSM 12 is not handling a signing request associated with that particular signing key.

The proxy HSM 16 will also send a confirmation of the signing request occurring successfully to the client 14 from which the request was received (step 414). This can include, for example, returning a confirmation of signing to the client that was received at the proxy HSM 16 from the HSM 12.

In some embodiments, the proxy HSM 16 may transmit the key destroying instruction immediately upon receipt of confirmation of successful completion of the signing request. However, in other embodiments, the proxy HSM 16 may transmit the key destroying instruction only for those signing keys which have not been used for a predetermined period of time. In such cases, the proxy HSM 16 may maintain a table of recently used signing keys or clients, and upon expiration of a period of time, will remove the signing key or client from the table and transmit the key destroying request. Accordingly, in such embodiments, keys are removed from HSM 12 storage only if not used frequently or recently. Such an arrangement may be advantageous because, for frequently used signing keys, the remote storage and removal of the signing key from the HSM 12 may add some amount of overhead processing by requiring re-introduction of that signing key prior to execution of the signing request at the HSM. Of course, other schemes for determining when or whether to remove signing keys from memory of the HSM 12 may be used in a manner consistent with the present disclosure.

FIG. 5 illustrates an operational sequence 500 for managing key generation and signing requests in the environment illustrated in FIG. 1. The sequence as illustrated shows operations of each of a client 14, proxy HSM 16, an optional storage server 32, and a HSM 12 during key generation and in response to a signing request, according to example embodiments. As such, the operational sequence 500 illustrates operations of each of the described components when used in conjunction with a proxy HSM 16 operable using the methods described above in FIGS. 3-4, according to example embodiments.

As illustrated in FIG. 5, an operational sequence is initiated by a key request received at the proxy HSM 16 from a client device 14. As noted above, the key request is received by the proxy HSM 16 at an API 24, which is positioned between the client device and HSM 12. Accordingly, API 24 includes at least the functionality provided by an API of the HSM (e.g., API 20). However, the proxy HSM 16 may perform additional operations in conjunction with communication with the HSM via API 20, as discussed further herein.

The proxy HSM 16 transmits the key request to the HSM 12, and receives in response a confirmation message indicating that the HSM 12 has created the signing key requested by the client device 14. Upon receipt of the confirmation, the proxy HSM 16 can transmit a request to the API 20 of the HSM 12 to extract the signing key that was just created. For example, the proxy HSM 16 may transmit a key extraction request alongside a key identifier. In the embodiment shown, the HSM 12 wraps the signing key using a wrapping key (e.g., wrapping key 22) maintained securely within the HSM 12. The HSM 12 and then returns the wrapped version of the signing key to the proxy HSM 16.

In the embodiment shown, a key storage server 32 is positioned remotely from the HSM 12 and is configured to store wrapped signing keys. In such a configuration, in the example shown, the wrapped signing key is transmitted by the proxy HSM 16 to the key storage server 32, which in turn stores that wrapped key in a key storage 30. The key storage server 32 can then return a message confirming storage of the wrapped signing key. Of course, it is noted that the wrapped signing keys could be stored locally at the proxy HSM 16 without requiring use of the key storage server 32: in such an example, transmission of the wrapped key is unnecessary.

Once the wrapped version of the signing key is stored in a key storage, the proxy HSM 16 can transmit a key destruction request to the HSM 12. The key destruction request will cause the HSM 12 to remove the signing key from storage at the HSM 12. The HSM 12 can then transmit a confirmation message back to the proxy HSM 16. The proxy HSM 16 may then, either after receipt of the confirmation, or any time after receiving the wrapped signing key from the HSM 12, transmit a confirmation that the key request has been completed to the client device 14. Accordingly, a key creation process is accomplished without requiring storage of the created signing key at the HSM 12.

At some time after the key creation process, the proxy HSM 16 may receive a signing request from the client device 14. At this point, because the HSM 12 does not have stored the signing key of the client, the proxy HSM 16 transmits a key retrieval request that can include, for example, a client identifier or key identifier to a key server 32. The key server 32 may retrieve the key from a database, and return the key, in wrapped form, to the proxy HSM 16. Of course, if the wrapped version of the signing key is stored at the proxy HSM 16, rather than transmitting a retrieval request to the key server 32 the proxy HSM 16 may simply retrieve the wrapped signing key from a local database.

Upon retrieval of the wrapped signing key, the proxy HSM 16 can transmit a key insertion command to the HSM 12, e.g., via API 20. Specifically, the proxy HSM 16 can provide the wrapped version of the signing key to the HSM 12, which can store the signing key in local memory. In some embodiments, the HSM 12 stores the signing key in wrapped form, preserving security of the key. In alternative embodiments, the HSM 12 may store the signing key in an unwrapped form, but in a secure storage of the device to prevent retrieval for compromise of the signing key. The HSM 12 can then return a confirmation to the proxy HSM 16, indicating that the signing key has been successfully loaded into the HSM 12.

In the embodiment shown, the proxy HSM 16 can, upon receipt of the confirmation, transmit a signing request to the HSM 12 via API 20. The HSM 12 can then perform a signing operation, and the signed response can be returned to the proxy HSM 16. In example embodiments, the signing operation may include unwrapping the signing key using the wrapping key securely stored within the HSM 12, and executing the signing request. In other embodiments, particularly where of the signing key is stored in the encrypted form at the HSM, the unwrapping may not be required.

It is noted that although in the embodiment shown the key insertion and signing requests are shown as separate, distinct operations and messages exchange between the proxy HSM 16 and HSM 12, in alternative embodiments the key insertion and signing request may be combined. In such embodiments, the wrapped key is provided alongside another document for signature, and the HSM 12 first unwraps and stores the signing key, then using that signing key to perform the signature operation. In such an embodiment, the confirmation of key insertion may be returned alongside the signed response.

Upon receipt of the signed response, the proxy HSM 16 can determine that use of the signing key by the HSM 12 is complete. Accordingly, the proxy HSM 16 may transmit a key destruction command to the HSM 12 (e.g., via API 20). The HSM 12 will, in response, remove the signing key from storage. The HSM 12 may then return a confirmation that the signing key has been removed. Upon completion of the signing operation (e.g., after receipt of confirmation of the key destruction command, or at least after receipt of confirmation of the signed response), the proxy HSM 16 can return a signed response to the client 14, thereby completing the signing operation.

Referring to FIG. 5 generally, it is noted that for a key generation request for which a signing request is performed, the HSM 12 is not required to store the signing key associated with a particular client from which the request is received. Still further, the HSM 12 will not generally retain the signing key after a key generation request or signing request is performed, with the signing key instead being stored in wrapped form in a storage external to the HSM 12 (e.g., key storage 30). Accordingly, signing keys are only required to be stored on the HSM 12 for a relatively short period of time, thereby minimizing memory requirements. Of course, it is noted above that the timing for key destruction commands may vary according to a number of factors, e.g., based on a timing threshold, recently used list, or other methodologies.

Referring to FIGS. 1-5, in accordance with aspects of the present disclosure, it is noted that the present disclosure has a number of advantages over existing systems. In particular, although the signing key for a particular client is stored externally from the HSM, the signing key is only made available external to the HSM in wrapped form, and using a wrapping key that is only known to the HSM. Accordingly, even though the signing key is at a server that may be less secure than the HSM, that signing key may still not be used or compromised, because no other device can access the wrapping key. Still further, the HSM does not need to store the signing key continuously, but instead may reload that signing key on an as needed basis based on detection of a signing request at a proxy HSM. Other advantages are presented by the present disclosure is well as reflected above and in the appended claims.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method of managing a signing request, the method comprising:
   at a hardware security module (HSM) associated with a proxy HSM:
      registering a signing key for use with the HSM, wherein registering the signing key for use with the HSM includes:
         receiving a request from the proxy HSM at the HSM for generation of the signing key;
         in response to the request, generating the signing key;
         performing a wrapping operation at the HSM to create the wrapped version of the signing key;
         transmitting the wrapped version of the signing key from the HSM to the proxy HSM; and
         destroying the unwrapped version of the signing key at the HSM;
   at the proxy hardware security module:
      after registering the signing key for use with the HSM, receiving a signing request originated from a client device that is targeted to an HSM associated with the proxy HSM;
      retrieving a wrapped version of the signing key that is required to fulfill the signing request;
      providing, to the HSM, the signing request and the wrapped version of the signing key;
   at the HSM:
      unwrapping the wrapped version of the signing key using a wrapping key securely stored at the HSM to generate an unwrapped version of the signing key;
      performing a signing operation using the unwrapped version of the signing key;
      transmitting a signed response from the hardware security module to the proxy HSM;
   further at the proxy HSM:
      after receiving the signed response at the proxy HSM, transmitting a request initiated at the proxy HSM to destroy only the unwrapped version of the signing key from the proxy HSM to the hardware security module, the proxy HSM maintaining the wrapped version of the signing key external to the HSM;
      receiving, at the proxy HSM, a confirmation message indicating destruction of the unwrapped version of the signing key at the HSM hardware security modulo while maintaining the wrapped version of the signing key at the proxy HSM; and
      after receiving the confirmation message, transmitting the signed response from the proxy HSM to the client device.

2. The method of claim 1, further comprising receiving a confirmation message from the HSM at the proxy HSM indicating completion of the signing operation.

3. The method of claim 1, wherein the wrapping operation is performed using a wrapping key securely maintained at the HSM.

4. The method of claim 1, further comprising storing the wrapped version of the signing key in a storage remote from the HSM.

5. The method of claim 4, wherein the storage has a capacity greater than a storage capacity of the HSM.

6. The method of claim 1, wherein the proxy HSM receives the signing request at a first API and submits the signing request and the wrapped version of the signing key to the HSM at a second API different from the first API.

7. A system comprising:
   a proxy hardware security module (HSM) comprising:
      a processor; and
      a memory storing instructions executable by the processor to cause the proxy HSM to:
         receive a signing request from a client device that is targeted to a HSM associated with the proxy HSM;
         retrieve a wrapped version of a signing key that is required to fulfill the signing request from a storage location separate from the HSM;
         provide, to the HSM, the signing request and the wrapped version of the signing key;
         receive a signed response from the HSM;
         after receiving the signed response, transmit a request initiated at the proxy HSM to destroy only an unwrapped version of the signing key from the proxy HSM to the HSM while maintaining the wrapped version of the signing key at the proxy HSM;
         receive, from the HSM, a confirmation message indicating destruction of the unwrapped version of the signing key at the HSM; and
         after receiving the confirmation message, transmit the signed response to the client device;
   wherein:
   prior to providing the wrapped version of the signing key, the signing key is registered for use with the HSM, including the HSM receiving a request from the proxy HSM to generate the signing key, generating the signing key, performing a wrapping operation to create the wrapped version of the signing key, and destroying the unwrapped version of the signing key at the HSM such that the HSM generates but does not retain the signing key, and
   the proxy HSM maintains the wrapped version of the signing key external to the HSM.

8. The system of claim 7, wherein the signing key is generated by the HSM in response to a request received from the proxy HSM prior to the signing request.

9. The system of claim 7, wherein the proxy HSM is configured to, upon receiving a response to the signing request from the HSM, transmitting a key destroying request to the proxy HSM, such that upon completion of the signing request, the HSM does not retain the signing key.

10. The system of claim 7, further comprising the HSM.

11. The system of claim 7, wherein the proxy HSM includes an API configured to receive requests to be routed to the HSM.

12. The system of claim 7, wherein the wrapped version of the signing key is maintained in storage at the proxy HSM.

13. The system of claim 7, further comprising a remote storage device, wherein the proxy HSM retrieves the wrapped version of the signing key from the remote storage device.

14. The system of claim 13, wherein the remote storage device is located remotely from the proxy HSM and the HSM.

15. The system of claim 7, wherein the proxy HSM is further configured to, prior to receiving the signing request:
 transmit a request to the HSM for generation of the signing key;
 receive a wrapped version of the signing key from the HSM; and
 in response to receiving the wrapped version of the signing key, transmit a key destroying message to the HSM.

16. A proxy hardware security module (HSM) comprising:
 a processor; and
 a memory storing instructions executable by the processor to cause the proxy HSM to:
  transmit a request to the HSM for generation of the signing key, the request being originated from a client device;
  receive a wrapped version of the signing key from the HSM, the signing key being registered for use with the HSM and the wrapped version of the signing key being generated at the HSM;
  in response to receiving the wrapped version of the signing key, transmit a key destroying message to the HSM, thereby destroying the unwrapped version of the signing key at the HSM;
  storing the wrapped version of the signing key in storage remote from the HSM;
  receive a signing request that is targeted to a HSM-associated with the proxy HSM;
  retrieve a wrapped version of the signing key that is required to fulfill the signing request from a storage location separate from the HSM;
  provide, to the HSM, the signing request and the wrapped version of the signing key;
  after receipt of a response to the signing request indicating successful execution of a signing operation by the HSM, transmitting a key destroying request to the HSM that is initiated at the proxy HSM, such that upon completion of the signing request, the proxy HSM-maintains the wrapped version of the signing key external to the HSM and the HSM does not retain the signing key;
  receive a confirmation message indicating destruction of the unwrapped version of the signing key at the HSM; and
  after receiving the confirmation message, transmit the signed response from the proxy HSM to the client device.

17. The proxy HSM of claim 16, wherein the request for generation of the signing key, the signing request, and the key destroying request are transmitted to an API of the HSM.

18. The proxy HSM of claim 16, wherein storing the wrapped version of the signing key comprises storing the wrapped version of the signing key in a database remote from the proxy HSM.

19. The method of claim 1, wherein the wrapping key is maintained exclusively at, and only known to, the HSM.

* * * * *